April 24, 1951     H. A. KENNEDY     2,550,152
STORAGE BATTERY LIQUID LEVEL CONTROLLER
Filed Oct. 26, 1949
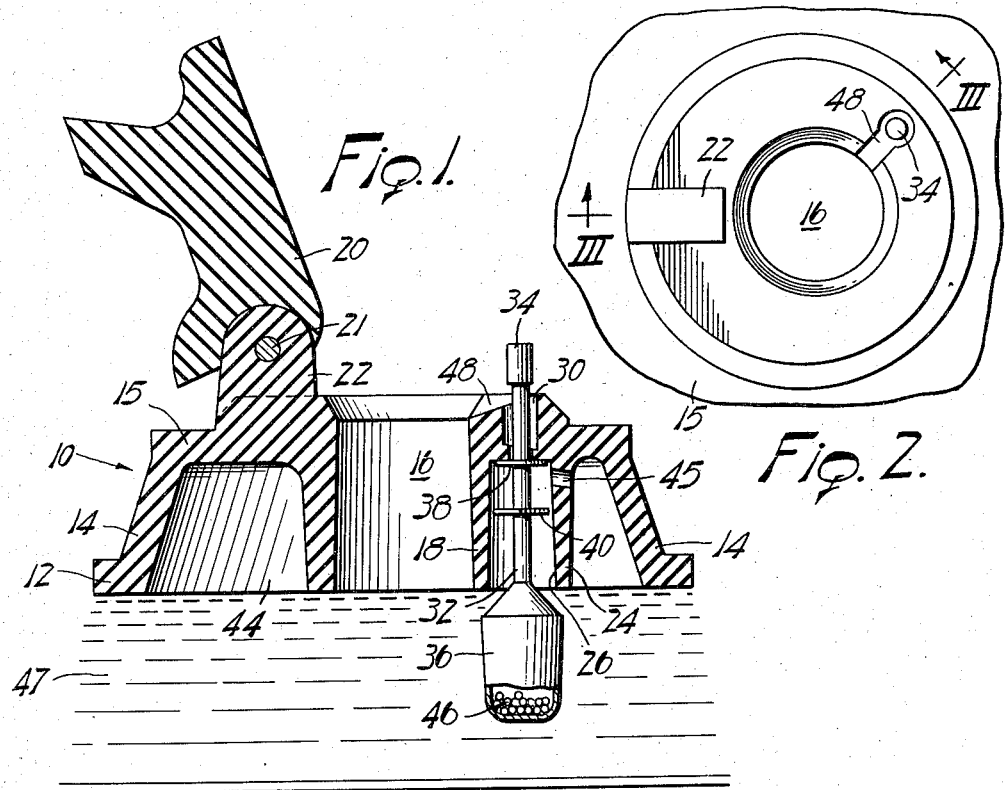
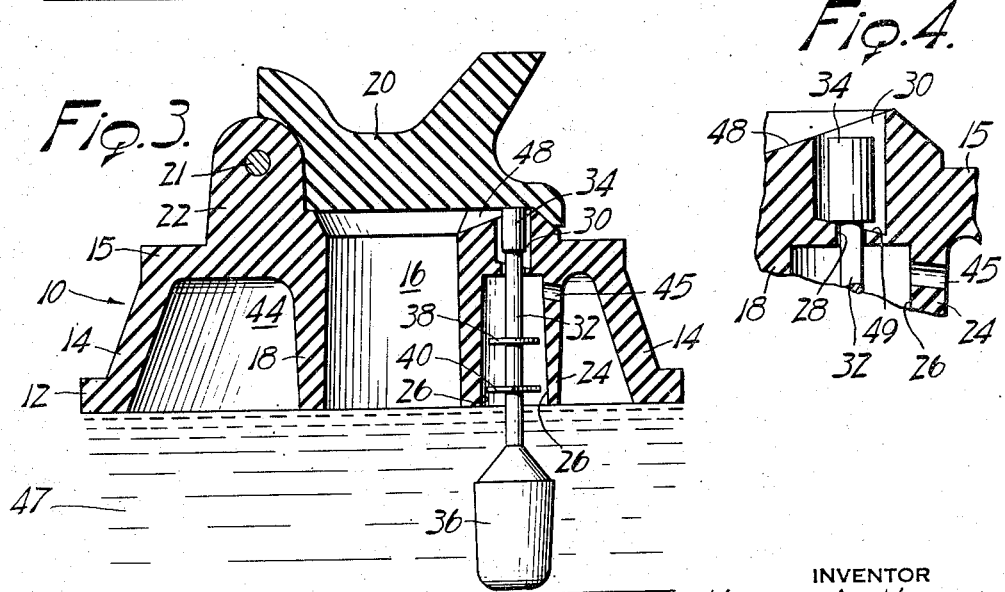
INVENTOR
Henry A. Kennedy
BY
Bean, Brooks, Buckley & Bean
ATTORNEYS Patented Apr. 24, 1951

2,550,152

UNITED STATES PATENT OFFICE 2,550,152

STORAGE BATTERY LIQUID LEVEL CONTROLLER

Henry A. Kennedy, Philadelphia, Pa., assignor to National Battery Company, St. Paul, Minn.

Application October 26, 1949, Serial No. 123,696

6 Claims. (Cl. 136—182)

This invention relates to storage batteries, and more particularly to an improved battery liquid level indicator and filling control device.

Storage batteries must be periodically serviced by adding water and/or acid to maintain the electrolyte solution therein within a permissible level range. Frequently such batteries are carried within cramped and out-of-way quarters providing limited head room conditions, whereby the battery cell filling openings are relatively inaccessible to the servicing personnel for liquid level inspection and refilling operations. Nevertheless, it is necessary for servicemen to regularly open each battery cell cap to check the liquid level therewithin and to replenish the liquid supply if necessary.

It is one of the objects of the present invention to provide an improved visual signaling device that is incorporated in the battery cover and is readily visible when viewed from above or from a side of the battery to indicate the level of the battery electrolyte prior to, during and after a filling operation.

Another object of the invention is to provide an automatic valve device in conjunction with the filler opening to insure control of the desired high level of the battery liquid during a filling operation.

Another object of the invention is to provide an improved combination level indicator and filling control device in conjunction with the battery gas vent opening.

Other objects and advantages of the invention will appear from the specification hereinafter.

In the drawing:

Fig. 1 is a vertical section through a typical storage battery cell cover member incorporating a liquid level indicator and filling control device of the invention; showing the liquid level indicator to be in high level or battery full position;

Fig. 2 is a fragmentary top plan view of the cover device of Fig. 1, with the cap member thereof removed;

Fig. 3 is a section similar to Fig. 1, and taken along line III—III of Fig. 2, but showing the cover cap in closed position and depressing the liquid level indicator device despite the fact that the liquid is at "full" level; and Fig. 4 is a fragmentary illustration, on an enlarged scale, of a detail of the liquid level indicator and filling control device, showing the part in "low" level condition.

The invention is illustrated in conjunction with a typical industrial storage battery cell cover member which is designated generally at 10 to comprise a fabrication molded from hard rubber or the like to comprise a top cover element for a battery cell. Thus, the cover member 10 includes marginal edge portions 12 which are adapted to be arranged in cemented connection with the upper edges of the side wall portions of the battery cell container so as to complete the enclosure thereof. As shown herein, the cover member 10 is formed to include raised side wall portions 14 and a top wall portion 15 which is centrally bored as indicated at 16 and formed with an integral cylindrical skirt portion 18 which is in continuation of the bore 16 throughout the vertical height of the cover member. A cap member 20 is hinged as indicated at 21 to integral boss portions 22 of the cover member, and the cap member 20 is dimensioned and arranged so as to be adapted to be swung down (manually or automatically) so as to cover the upper end of the bore 16 under normal battery operative conditions. However, the cap 20 may be swung upwardly so as to provide access to the interior of the battery cell for liquid replenishment purposes.

The inner wall portion 18 of the cover member 10 is sectionally enlarged as indicated at 24 and bored as indicated at 26 to provide a vertically disposed cylindrical opening or chamber parallel to and separate from the filling well 16. Also, the cover member 10 is bored in vertical alignment with the chamber 26, as indicated at 28 (Fig. 4) and is additionally counterbored in vertical alignment therewith as indicated at 30 through the top wall portion of the cover member. A liquid level indicator and filling control device is disposed within the bored portions 26—28—30, and as illustrated herein comprises a valve stem 32 having an enlarged head 34; a hollow float portion at its lower end 36; a valve disc 38; and a multi-fingered fender 40. The valve stem 32 and the bore 28 are relatively dimensioned so that the valve member is freely floatable in vertical directions relative to the cover member 10, and the fender device 40 is designed so as to stabilize the valve member in free vertically floating position.

Thus, the outer wall 14 and the inner wall structure 18 cooperate to define therebetween an annular chamber 44 which is closed by the top wall portion 15 of the cover member, and which will be hereinafter referred to as the "air lock" chamber. A vent port 45 is provided to interconnect the air lock chamber 44 and the valve chamber 26 adjacent the upper levels thereof, and a groove 48 is cut into the upper rim of the cover member so as to communicate the filler bore 16 and the upper valve chamber 30 when the cap 20 is down in closed position as illustrated by Fig. 3.

Thus, it will be appreciated that the cover cap 20 will normally remain in closed position as illustrated by Fig. 3 under normal battery operative conditions, and that while the battery is operating the gases generated thereby will flow upwardly into the central bore 16 and also into the chamber 44. The gas developing within the chamber 44 will find escape through the port 45 and the bore 28 whereby it joins the gas moving upwardly into the central bore 16, and whereby such gas accumulations press upwardly against the cap 20 and find escape by passing out over the upper rim of the cover member 10 and under the cap 20. Hence, it will be appreciated that the cover and cap structures effectively baffle the battery gasing action and permit gas escape without splashing-out loss of the battery liquid.

Whenever it is desired to check the level of the liquid within the battery the cap 20 is simply lifted to open position as shown in Fig. 1. If the liquid level in the battery is up, the float device 36 of the valve member will thereupon cause the indicator head 34 to be projected upwardly above the level of the top of the cover member 10, as illustrated at Fig. 1; whereby this indicator head 34 will be readily visible from any position above or laterally of the battery even though the latter may be racked within a relatively inaccessible and out of the way place. To facilitate such observation of the indicator head 34, the latter may be coated or otherwise treated with some readily visible pigment or the like, so as to provide a brightly colored or illuminated target for increased visibility purposes. If, on the other hand, the level of liquid in the battery is low, whenever the cap 20 is opened the indicator head 34 will remain in retracted position within the well 30. Thus, the indicator is not visible from laterally of the battery, and the attendant is thereby advised that the liquid level in the battery is low. As indicated at 46 (Fig. 1) some suitable weight device such as a selected number of lead pellets may be disposed within the float member 36 to regulate the float action in accord with the operating specific gravity requirements.

Thus, whenever it is indicated that the battery requires the addition of water and/or acid, it may be fed through the filler well 16 in the customary manner. However, it is a particular feature and advantage of the present invention that whenever a filling operation is in progress the valve member 38 is operative to control the filling operation so as to prevent over filling of the cell. This is accomplished by locating the valve disc 38 on the stem 32 in such position that whenever the liquid in the cell as indicated at 47 rises to the prescribed high level elevation, the float device 36 will thereupon operate the valve stem to such position that the disc 38 closes off the bore 28 (Fig. 4). Hence, at such time the air trapped within the air lock chamber 44 is prevented from escaping to the atmosphere through the ports 45 and 28, and there is thus developed a back pressure within the chamber 44 which prevents the rising of liquid upwardly thereinto. At the same time the indicator head 34 will be disposed in upwardly projected position so as to clearly signal to the attendant that the high liquid level has been reached; but in event the attendant is careless and causes additional liquid to be added it will simply flow into the filler well 16 and will not pass into the air lock chamber 44. Then, when the cap 20 is closed manually or automatically, the latter forcibly depresses the valve stem 32 downwardly to the position thereof shown in Fig. 3, thereby removing the valve disc 38 from closing position relative to the bore 28. Consequently, any liquid remaining within the filler well 16 will then be free to seek its own level within the lower portions of the well 16 and the chamber 44 because the air pressures within the upper portions of the well 16 and the chamber 44 are thereupon permitted to equalize. Hence, even though a substantial quantity of liquids may have been inadvertently poured into the central well 16, upon closure of the cap 20 such excess liquid will seek its level within the entire cover structure, and will thereby distribute so as to not substantially exceed the preferred high level elevation for the liquid within the cell.

It will be appreciated that the target head 34, being of enlarged diameter compared to the stem 32, also functions as a stop device to prevent the float member from dropping downwardly through the cover member 10 when the liquid level recedes within the cell. Also, particular attention is called to the fact that the bottom end portion of the bore 30 is inclined or grooved as indicated at 49 (Fig. 4) so that whenever the liquid level in the battery is low and the valve device falls into retracted position, the head 34 will not seal the bore 28.

Whereas, only one form of the invention has been shown and described in detail it will be apparent to those skilled in the art that the invention is not so limited but that various changes may be made therein without departing from the spirit of the invention or the scope of the appended claims.

I claim:

1. In a storage battery, a top cover structure comprising a generally closed cover having therethrough a filler opening, an air lock chamber having a substantial vertical dimension disposed within said cover separate from said filler well, a liquid level control and indicator device mounted upon said cover and comprising a vertically slidable stem disposed within a bored portion of said cover and terminating at its upper end with an indicator head portion, said stem carrying at its lower end a float device and intermediately of its ends a valve disc member, the bore within said cover member having a shoulder portion intermediately thereof for cooperation with said valve disc to provide a valving action whenever the liquid level rises to cause said float to elevate said valve stem, a vent port intercommunicating said air lock chamber and the lower end portion of said cover bore below the position of said valving action, and a cap member hinged to said cover and adapted to be swung downwardly thereon so as to simultaneously close the filler well opening therethrough and to depress said indicator end portion of said valve member to retracted position within said cover.

2. In a storage battery, a top cover structure comprising a body having therethrough a vertical filling opening, an air lock chamber formed within said body separate from said filling opening, a liquid level control and indicator device comprising a valve member disposed in vertically movable relation within a bored portion of said cover and terminating at its upper end with an indicator head portion, said valve member carrying at its lower end a float device and intermediately of its ends a valve, the bore within said cover member having a valve seat portion intermeditely thereof for cooperation with said valve to provide a valving action whenever the liquid level rises to cause said float to elevate said valve stem, a vent port intercommunicating said air lock chamber and the cover bore below the position of said valve seat portion, and a cap member hinged to said cover and adapted to be swung downwardly thereon so as to simultaneously close the filling opening therethrough and to depress said indicator end portion of said valve member to retracted position within said cover structure.

3. In a storage battery, a top cover structure comprising a generally closed cover having therethrough a filling opening, an air lock chamber having a substantial vertical dimension disposed within said cover separate from said filling opening, a liquid level control and indicator device mounted upon said cover and comprising a vertically slidable stem disposed within a bored portion of said cover and terminating at its upper end with an indicator head portion, said stem carrying at its lower end a float device and intermediately of its ends a valve disc member, the bore within said cover member having a valve seat portion intermediately thereof for cooperation with said valve disc to provide a valving action whenever the liquid level rises to cause said float to elevate said valve stem, a vent port intercommunicating said air lock chamber and the cover bore below the position of said valve seat, and a cap member hinged to said cover and adapted to be swung downwardly thereon so as to simultaneously close the filling opening therethrough and to depress said indicator end portion of said valve member to retracted position within said cover.

4. In a storage battery, a top cover structure comprising a generally dome shaped cover having therethrough a filling opening subtended by a skirt reaching to a substantial distance below the top level of said filling opening, an open bottom air lock chamber having a substantial vertical dimension formed within said cover separate from said filling opening and skirt, a liquid level control and indicator device comprising a valve stem disposed within a vertically bored portion of said cover to be vertically slidable therein and terminating at its upper end with an indicator head portion, said stem carrying at its lower end a float device and intermediately of its ends a valve member, the stem bore within said cover member having a valve seat portion intermediately thereof for cooperation with said valve member to provide a valving action whenever the liquid level rises to cause said float to elevate said valve stem, a vent port intercommunicating said air lock chamber and the lower end portion of said stem bore below the position of said valve seat, and a cap member hinged to said cover and adapted to be swung downwardly thereon so as to simultaneously close the filling opening and to depress said indicator end portion of said stem member to retracted position within said cover while displacing said valve member from valve seat contacting position.

5. In a storage battery, a top cover structure comprising a body having therethrough a vertical battery liquid filling opening, a recess in the under surface of said body forming an air lock chamber separate from said filling opening, a liquid level control and indicator device comprising a stem disposed vertically and in free sliding relation within a vertically bored portion of said cover and terminating at its upper end with a battery liquid level indicator head portion, said stem carrying at its lower end a float device and intermediately of its ends a valve member, the bore within said cover member having a valve seat portion intermediately thereof for cooperation with said valve member to provide a valving action whenever the liquid level rises to cause said float to elevate said stem to a predetermined elevation, a vent port intercommunicating said air lock chamber and the cover bore below the position of said valve seat portion, and a cap member hinged to said cover and adapted to be swung downwardly thereon so as to simultaneously close the filling opening therethrough and to depress said indicator end portion of said stem to retracted position within said cover structure.

6. In a storage battery, a top cover structure comprising a body having therethrough a vertical battery liquid filling opening, a first recess in the under surface of said body forming an air lock chamber separate from said filling opening, a second recess in the under surface of said body forming a valve seat and arranged in communication with said filling opening near the top thereof, a liquid level control device comprising a member carried by said body and movable relative thereto, said member having a float device thereon and a valve device for cooperation with said valve seat to provide a valving action whenever the liquid level within said battery rises to cause said float to elevate said member to a predetermined elevation, a vent port intercommunicating said air lock chamber and said second recess below the position of said valve seat, and a cap member hinged to said cover and constructed and arranged to be swung downwardly thereon so as to simultaneously close the filling opening therethrough and to depress said member to valve open position.

HARRY A. KENNEDY.

REFERENCES CITED

The following references are of record in the file of this patent:

UNITED STATES PATENTS

| Number | Name | Date |
|---|---|---|
| 1,508,829 | Woodbridge | Sept. 16, 1924 |
| 2,210,450 | Flynn | Aug. 6, 1940 |
| 2,240,461 | Riggs et al. | Apr. 29, 1941 |
| 2,310,656 | Shank | Feb. 9, 1943 |
| 2,480,437 | Berg et al. | Aug. 30, 1949 |

FOREIGN PATENTS

| Number | Country | Date |
|---|---|---|
| 114,986 | Australia | Apr. 23, 1942 |